(12) United States Patent
Sueoka et al.

(10) Patent No.: US 7,217,399 B2
(45) Date of Patent: May 15, 2007

(54) METHOD AND REACTION APPARATUS FOR TREATING OBJECT WITH GAS

(75) Inventors: Kazuhiko Sueoka, Ageo (JP); Yasuji Takada, Ageo (JP)

(73) Assignee: Fukoku Co., Ltd., Saitama-ken (JP)

( * ) Notice: Subject to any disclaimer, the term of this patent is extended or adjusted under 35 U.S.C. 154(b) by 481 days.

(21) Appl. No.: 10/700,473

(22) Filed: Nov. 5, 2003

(65) Prior Publication Data

US 2004/0091619 A1    May 13, 2004

(30) Foreign Application Priority Data

Nov. 13, 2002    (JP)    ............... 2002-329889

(51) Int. Cl.
 *B01J 8/08* (2006.01)
 *B01J 19/00* (2006.01)
(52) U.S. Cl. ............... 422/232; 422/291; 422/292; 422/297; 422/304
(58) Field of Classification Search ............ 427/248.1; 198/359, 523; 209/149; 422/233, 291, 292, 422/297, 304, 232; 34/579, 361, 363, 364, 34/409, 516, 443; 118/729
 See application file for complete search history.

(56) References Cited

U.S. PATENT DOCUMENTS 1,500,715 A    7/1924    Perczel
4,539,185 A    9/1985    Mueller
5,448,838 A    9/1995    Edmonds

FOREIGN PATENT DOCUMENTS

| FR | 787 786 A | 9/1935 |
| JP | SHO 37-3809 | 6/1962 |
| JP | 59 046127 A | 3/1984 |
| JP | HEI 4-19021 | 3/1992 |

*Primary Examiner*—N. Bhat
(74) *Attorney, Agent, or Firm*—Jacobson Holman PLLC

(57) ABSTRACT

There are disclosed a method and a reaction apparatus which can safely and continuously treat/discharge especially a short object to be treated without any direct contact with a gas atmosphere, and which surely/efficiently treats the object with a gas without any uneven treatment. A short object A to be treated is put in a hermetically sealed cylindrical treatment section 1. In the treatment section 1, the object is held in a predetermined position by a first operation piece 11 to be treated with a gas for a predetermined time. Then, the holding by the first operation piece is released to move the object A by a desired distance. Subsequently, the object is held in a predetermined position by a second operation piece 12 to be treated again with the gas for a predetermined time, and then a treated object A1 is discharged. This discharged treated object A1 is conveyed to the outside of the apparatus.

17 Claims, 4 Drawing Sheets

METHOD AND REACTION APPARATUS FOR TREATING OBJECT WITH GAS

BACKGROUND OF THE INVENTION

1. Field of the Invention

The present invention relates to a method and an apparatus for treating an object with a gas, e.g., a wiper blade for cleaning window glass of an automobile, a train or the like.

2. Description of the Related Art

There are generally known wiper blades made of rubber/synthetic resins, and surfaces of these wiper blades must be treated. It is because in a state before the treatment, friction resistance is large due to excessively high adhesion to cause application of a load more than necessary on a motor, motor locking, and other problems, and wear resistance is extremely low to cause early losses and various other problems.

Thus, for example, in the case of treating a wiper blade of a product shape formed by press molding or the like, various treatment methods have conventionally been employed. One example is that a blade is set in a hermetically sealed container filled with a desired treatment gas (bromine gas, chlorine gas or the like), treated with the gas at a desired temperature for a desired time, and then taken out and washed by water to be made into a product (Jpn. Pat. Appln. KOKOKU Publication No. 37-3807).

According to the conventional method, the gas must be completely removed from the container in order to take out the treated blade from the container after gas treatment work. Such a method requires time and labor for gas removal, and consequently a treatment capability cannot be improved.

There is known another wiper blade which is formed by treating a continuous object formed in a long shape by extrusion molding with a gas, and then cutting it into individual product shapes (Jpn. Pat. Appln. KOKOKU Publication No. 4-19021). Such a method and an apparatus have constitutions suited to continuous treatment of a long continuous object, comprise a long continuous object in an inclined manner, and are adapted to continuously put the long object in a treatment cylinder filled with a treatment gas, treat it with a gas in a gas atmosphere in the cylinder, and then pull it out from the apparatus to sequentially cut it into desired product shapes. According to the method and the apparatus, since the object to be treated is continuously passed in the gas atmosphere, treatment work can be carried out continuously without any gas removal work after the gas treatment different from the aforementioned case. Thus, a treatment capability is high.

Such a conventional art targets a long continuous object, but cannot treat a blade (short object) formed in an individual product shape by press molding or the like with a gas by the method/apparatus because of its constitution.

That is, in the case of the short object, it is impossible to hold it in the treatment cylinder for a fixed time, and then to automatically pull out a treated blade from the treatment cylinder to take it out of the outside of the apparatus.

Further, for example, if a blade of a product shape is put in the conventional treatment cylinder, because of inclination of the treatment cylinder, the blade falls to a bottom part in the treatment cylinder by its own weight, and then treated with a gas there for a fixed time. However, if the blade is treated with the gas in the fallen state to the bottom part in the cylinder, a part in contact with a cylinder inner wall may not be treated with the gas to cause uneven treatment.

The present invention has been made with the foregoing problems of the conventional art in mind, and objects of the invention are to provide a method and a reaction apparatus which can safely and continuously treat/discharge especially a short object to be treated without direct contact with a gas atmosphere, and which surely/efficiently treat the object with a gas without any uneven treatment.

SUMMARY OF THE INVENTION

Technical means developed by the present inventors in order to achieve the above objects are as follows:

A method for treating an object with a gas, comprises a step of putting the object in a hermetically sealed treatment section filled with a treatment gas; a treatment step of treating the put object with the gas at a desired position in a gas atmosphere in the treatment section for a desired time; a step of discharging the released treated object from the treatment section after the treatment step; and a conveying step of conveying the treated object discharged from the treatment section.

In the above method, the treatment step comprises a first treatment step of treating the object put in the hermetically sealed treatment section with the gas at the desired position in the gas atmosphere in the treatment section for the desired time; and a second treatment step of moving the object in the treatment section of the gas atmosphere to treat the object with the gas again at the desired position for the desired time, after completion of the first treatment step.

A reaction apparatus for treating an object with a gas comprises a treatment section which includes at least a treatment gas injection section, an inlet of the object and an outlet of the treated object, has a structure in which the object is automatically conveyed from the inlet to the outlet, and treats the object with the gas in a hermetically sealed space; and a conveying mechanism for conveying the treated object from an object outlet position of the treatment section to the outside of the apparatus, wherein the treatment section comprises a mechanism for holding the object in a gas atmosphere in the treatment section in a fixed place for a desired time.

The above treatment section comprises the mechanism for holding the object at the fixed place in the gas atmosphere in the treatment section for the desired time, and a mechanism for moving or swinging the object to prevent unevenness of the treatment.

The above apparatus further comprises at least two operation pieces disposed back and forth in a direction orthogonal to an advancing direction of the object in the treatment section to freely move up and down, wherein the two operation pieces are constituted of a first operation piece positioned on the inlet side of the object to be treated, and a second operation piece positioned on the outlet of the treated object; the first operation piece holds the object in a fixed place for a desired time to treat the object with the gas for a desired time, and then the first operation piece is raised to lower the object toward the outlet by a desired distance; and the second operation piece receives the object passed through the raised first operation piece, holds the object in a fixed place for a desired time to treat the object with the gas again for a desired time, and then the second operation piece is raised to lower the object toward the outlet.

The first and second operation pieces are formed to be different lengths: the first operation piece being formed to be short, and the second operation piece being formed to be long, and the operation pieces are vertically moved by the same mechanism. Furthermore, the first and second operation pieces are vertically moved by different mechanisms.

The above apparatus further comprises an operation piece disposed in the treatment section in a direction orthogonal to the advancing direction of the object, wherein the operation piece is adapted to be swung by a swinging mechanism. In this case, the operation piece may have a structure in which the object received in the treatment section is held in a fixed place for a desired time to be treated with the gas, swung back or forth in the advancing direction, and then held in a position to which it has been moved by a desired distance to be treated again with the gas for a desired time. Furthermore, the operation piece may have a structure in which the object received in the treatment section is swung back and forth in the advancing direction for a desired time to be treated with the gas.

The outlet side of the treatment section and one end side of the conveying mechanism facing the outlet side are positioned in a desired liquid which has filled a water tank.

The object is a short object formed in a product shape, and specifically, the object is a wiper blade, and the wiper blade is made of rubber or a synthetic resin.

The above apparatus further comprises a feeding mechanism and a pressing roller disposed in the vicinity of the object inlet to forcibly feed the object through the object inlet by holding it therebetween, wherein the pressing roller is adapted to be separated.

PREFERRED EMBODIMENTS OF THE INVENTION

Next, an embodiment of the present invention will be described with reference to the accompanying drawings. The embodiment is only illustrative of the invention. Thus, the embodiment should in no way limit interpretation of the invention. Design changes can be properly made within the scope of the invention as occasion demands.

Figure 1:
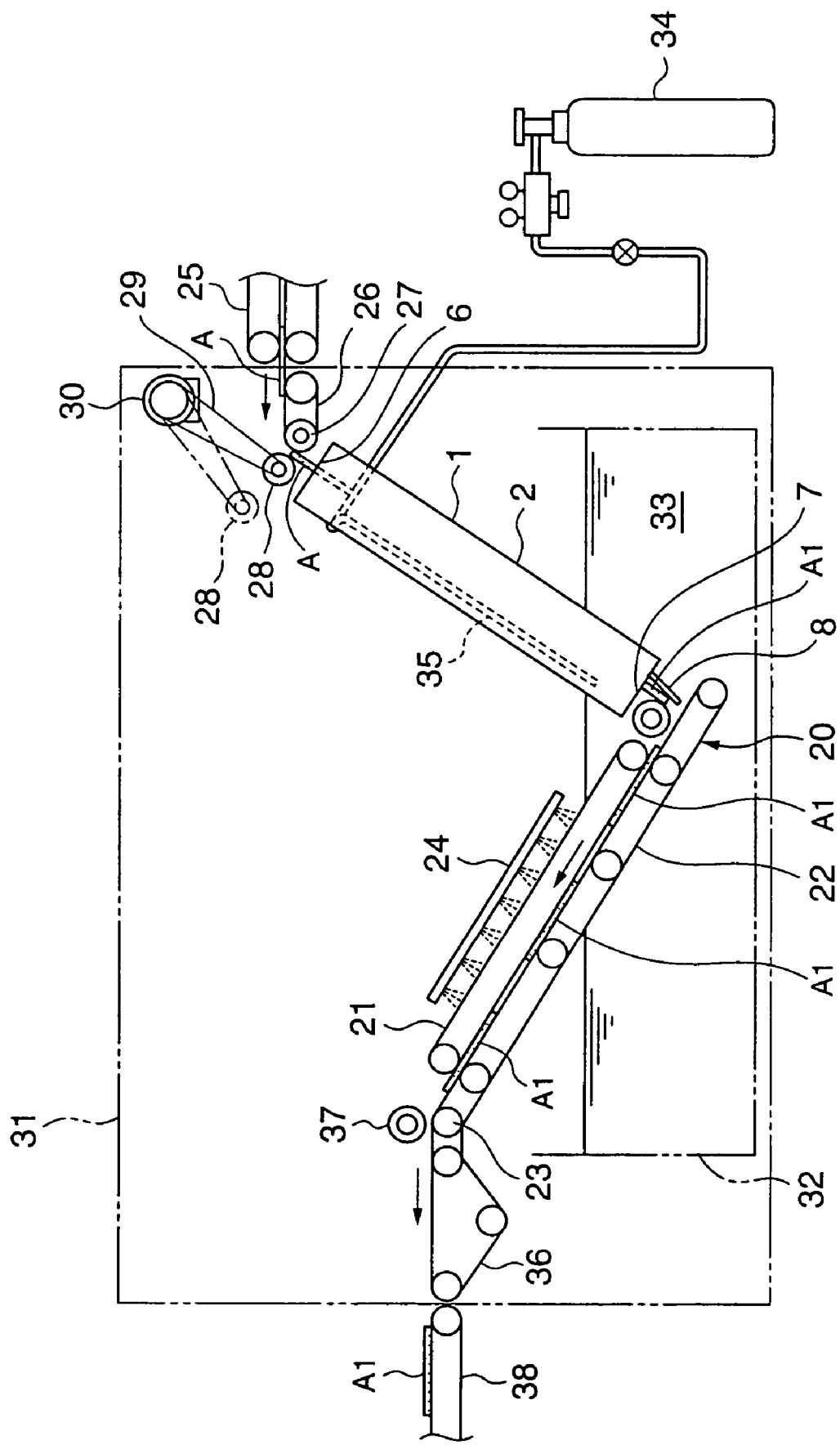
FIG. 1 is an overall schematic view showing an embodiment of the present invention.

FIG. 1 is an overall schematic view of the present invention, in which a reference numeral 25 denotes a conveying mechanism of an object to be treated (untreated) A, 1 a treatment section, and 20 a conveying mechanism of a treated object A1.

Hereinafter, specific embodiments of a method and a reaction apparatus for treating an object with a gas according to the present invention will be described in detail.

According to the gas treatment method of the present invention, a short object A to be treated which has been formed in an individual product shape by, e.g., press molding, is put in a hermetically sealed treatment section 1 filled with a treatment gas (step of putting an object in the treatment section).

The object A to be treated according to the invention is, for example, a short object formed in a product shape. Specifically, a wiper blade, more specifically a wiper blade made of rubber or a synthetic resin can be cited as representative examples. A well-known shape/material is used for the wiper blade within the scope of the invention. The specific examples are only examples and, needless to say, objects other than the wiper blade can be used properly within the scope of the invention.

Generally, a wiper is constituted of a pair (tandem) until last cutting. Thus, needless to say, the wiper in such a tandem state is included in the object A to be treated according to the invention.

The treatment section 1 is formed in a long cylindrical shape as a whole, which comprises an inlet 6 of the object A on its upper end side and an outlet 7 of a treated object A1 on its lower end side and which is adapted to insert a pipe 35 from a gas feeding section 34 into a cylinder 2 (treatment gas injection section). The treatment section 1 comprises a mechanism for holding the object A in a fixed place in a gas atmosphere in the treatment section 1 for a desired time, and a mechanism for moving or swinging the object A to prevent uneven treatment. According to the embodiment, the treatment section 1 has the aforementioned constitution, and description will be made based on this embodiment. However, according to the present invention, the treatment section 1 can comprise only the mechanism for holding the object A in the fixed place in the gas atmosphere in the treatment section 1 for the desired time.

For the gas which fills the treatment section 1, representative examples are a chlorine gas and a bromine gas, and a well-known treatment gas is properly selected within the scope of the invention depending on an object. A time for gas treatment is a well-known treatment time, and design changes can be made depending on various conditions of a material of the object. A temperature in the treatment section 1 may also be a well-known temperature, and design changes can be made depending on various conditions of the material of the object.

According to the embodiment, the pipe 35 from the gas feeding section 34 is inserted from an upper end side around the cylinder 2 of the treatment section 1 to feed the treatment gas from a lower position in the cylinder 2. However, there is no particular limitation on a method for feeding the treatment gas into the cylinder 2. For example, design changes can be optionally made such as a constitution in which the pipe 35 is inserted from the outlet 7 side of the treatment section 1 into the treatment section 1.

The treatment section 1 is arranged in a downward slope of a desired angle from the inlet 6 toward the outlet 7. On an object sliding contact surface 3 of its inside, a number of bearing rollers 4 . . . , 5 . . . are arranged at desired intervals from the vicinity of the inlet 6 to the vicinity of the outlet 7. An inclined angle of the treatment section 1 is preferably set to a degree at which at least the object A slides down into contact by its own weight.

The bearing roller 4 (5) is made of a material which is a rod of a desired diameter and little friction resistance, and adapted to be fixed or rotated. There is no particular limitation on an interval between adjacent bearing rollers 4 (5), but the interval is set to a level which does not hinder the sliding contact of the object A (e.g., fitting of the object A between the rollers 4, 4, falling to get stuck on the midway or the like). That is, a reason for disposing the bearing rollers 4 in such a manner to constitute the object sliding contact surface is as follows.

For example, if the object A is treated with a gas in a state of being slid into direct contact with a flat cylinder inner wall 2a, a surface of the object A slid into contact with the cylinder inner wall 2a is treated while the treatment gas is not completely fed, and consequently uneven treatment occurs. Thus, by arranging the bearing rollers 4 at every desired intervals as in the case of the embodiment, the treatment gas is fed to a surface a of the object A on the bearing roller 4 side to prevent uneven treatment.

There is some doubt that the treatment gas may not reach the surface a in contact with the bearing roller 4 to cause the aforementioned trouble. According to the present invention, however, since a constitution is employed in which the object A is held in a fixed place to be treated with a gas as described later, and then the object A is slightly moved or swung to change its holding place, and to be treated again with the gas, even the surface a in contact with the bearing roller 4 at the initial gas treatment stage can be sufficiently treated with the gas at the subsequent gas treatment stage. Thus, no such problems occur. The material of the bearing roller 4 (5) is not limited to that of the embodiment, but it can be properly changed as occasion demands. Additionally, according to the embodiment, the rollers 4, 5 are arranged left and right in a cylinder axial direction. However, at least only the roller (right roller in the drawing) 4 on which a bottom surface of the object A slides may be disposed. In a shown state, an interval between the left and right rollers 4, 5 is small. However, the drawing is only schematic, and an actual interval between the left and the right is larger than the shown interval.

According to the embodiment, the object sliding contact surface 3 is constituted of the bearing roller 4. However, the constitution is not limited to the embodiment as long as it has a structure in which the object A is automatically fed from the inlet 6 to the outlet 7 (concept including natural falling by own weight, and this concept applies throughout the specification). For example, operation effects similar to the foregoing can be provided by forming the cylinder inner wall 2a to be irregular. This sliding contact surface 3 may be adapted to enable sliding contact of the object A by its own weight, or to be mechanically operated to forcibly convey the object A.

Preferably, the inlet 6, the outlet 7 and the gas injection port are adapted to prevent gas leakage as much as possible by a well-known technology. The entire apparatus should be housed in a hermetically sealed box 31 of a desired size, and the box 31 should comprise a force exhaust system (not shown) to prevent gas leakage to the outside as much as possible.

The treatment section 1 needs to have at least the aforementioned constitution, an overall size is optional, and addition of other components is freely made which is within the scope of the invention.

A feeding mechanism (belt conveyor) 26 and a pressing roller 28 opposite a pulley 27 on a tail end side of the feeding mechanism 26 are disposed between the conveying mechanism 25 for conveying the object A to the treatment section 1 and the vicinity of the object inlet 6. By the tail end side pulley 27 of the feeding mechanism 26 and the pressing roller 28, the object A which has been conveyed is forcibly pushed through the inlet 6 of the treatment section 1.

The pressing roller 28 is connected through a belt 29 to a motor 30 to be rotated. The pressing roller 28 can be adapted to be separated from the tail end side pulley 27 of the feeding mechanism 26. This separation constitution is applied when a later-described long object is treated.

Then, gas treatment is carried out through the mechanism for holding the object A put into the treatment section 1 in a fixed place in gas atmosphere in the treatment section 1 for a desired time and the mechanism for moving or swinging the object A to prevent uneven treatment (first treatment step, second treatment step).

The mechanism for holding the object A in the treatment section 1 and the mechanism for preventing uneven treatment are used in a first treatment step of treating the object A with a gas in a desired place for a desired time, and a second treatment step of moving, after the first treatment step, the object A by a desired distance in the treatment section 1 of the gas atmosphere to treat the object with the gas again in a desired position for a desired time.

Specific constitutions of the mechanism for holding the object A in the treatment section 1 and the mechanism for preventing uneven treatment which are used in the first and second treatment steps are as follows.

First Embodiment

For example, the first embodiment employs a structure in which two operation pieces 11, 12 are disposed back and forth in a direction orthogonal to an advancing direction of the object A in the treatment section 1, and the two operation pieces 11, 12 are connected by a single cylinder rod 10 of a single air cylinder 9 to be simultaneously moved up and down. The two operation pieces 11, 12 are constituted of a first operation piece 11 positioned on the object inlet 6 side and a second operation piece 12 positioned on the treated object outlet 7 side.

The first and second operation pieces 11, 12 have different lengths: the first operation piece 11 being formed to be short, and the second operation piece 12 being formed to be long. A rising movement of the cylinder rod 10 is made in stages (two stages) (2-stage stroke cylinder).

Figure 2A:
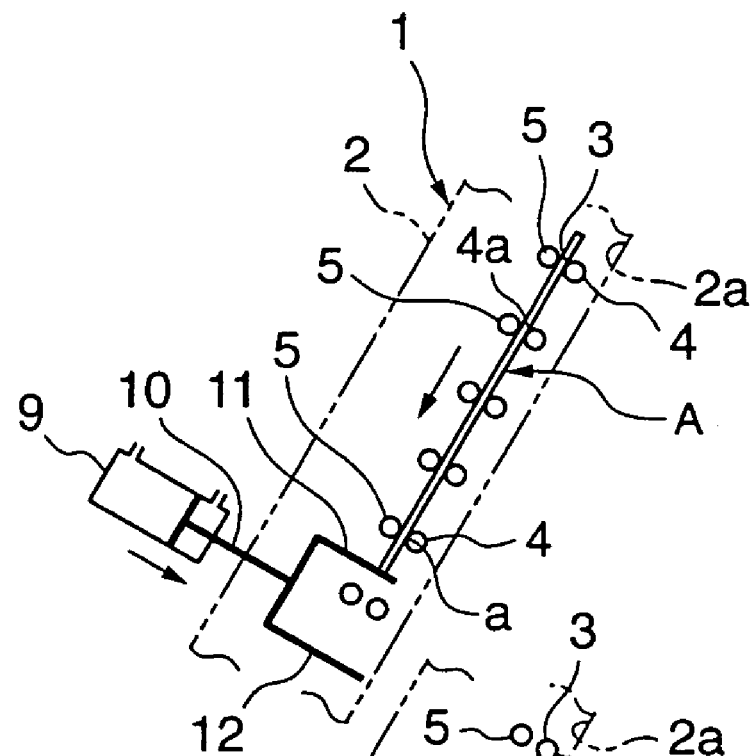
FIGS. 2A to 2C are schematic operation views showing main sections of the embodiment of the present invention.

That is, at a standby stage in which the object A is put into the treatment section 1, a downward movement of the cylinder rod 10 sets both of the first and second operation pieces 11, 12 equal to or lower than a level of a bearing roller top surface 4a in the cylinder 2 to close a passage space of the object A (FIG. 2A).

Thus, the object A put into the treatment section 1 is first retained by the first operation piece 11, and then held in this position for a desired time to be treated with a gas for a desired time (FIG. 2A).

After the passage of the desired time, when the cylinder rod 10 is raised, the short first operation piece 11 is removed from the passage space of the object A. The object A is moved by a desired distance toward the outlet 7 to be retained by the second operation piece 12 positioned on a downstream side.

Figure 2B:
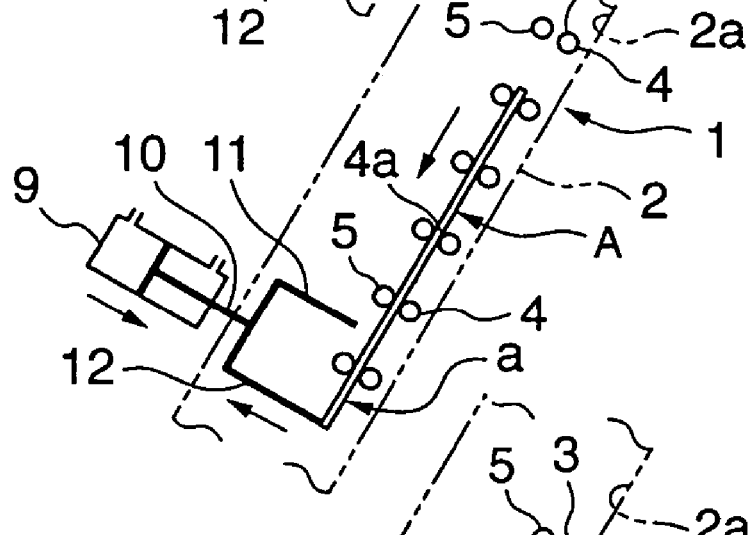

Then, in this state, the object A is held for a desired time to be treated again with the gas for a desired time (FIG. 2B).

That is, since the gas treatment operation based on the 2-stage constitution of the first and second operation pieces 11 and 12 causes a movement of the object A in an advancing direction in the cylinder 2, even the surface a in contact with the bearing roller 4 at the initial gas treatment stage in which the object A is held by the first operation piece can be sufficiently treated with the gas at the gas treatment stage in which the object A is held by the second operation piece 12.

Therefore, an interval between the first and second operation pieces 11 and 12 is set by adjusting an interval between the adjacent bearing rollers 4 so that the surface a of the object A is in contact with the bearing roller 4 when the object A is held by the first operation piece 11 is positioned between the bearing rollers 4 and 4 when the object A is held by the second operation piece 12.

Figure 2C:
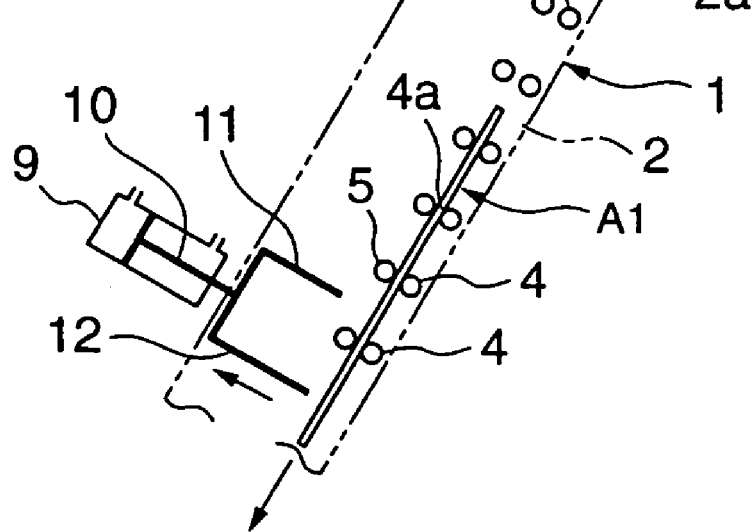

When the cylinder rod 10 is raised again, the second operation piece 12 is removed from the passage space of the object A, and the treated object A1 is slid into contact to be lowered toward the outlet 7 (FIG. 2C).

Second Embodiment

The first and second operation pieces may be vertically moved by different mechanisms. For example, a specific embodiment will be described with reference to FIGS. 3A to 3C.

A first operation piece 15 and a second operation piece 18 are formed in similar shapes, and upper ends thereof are connected to different air cylinders 13, 16 to separately operate the operation pieces.

Figure 3A:
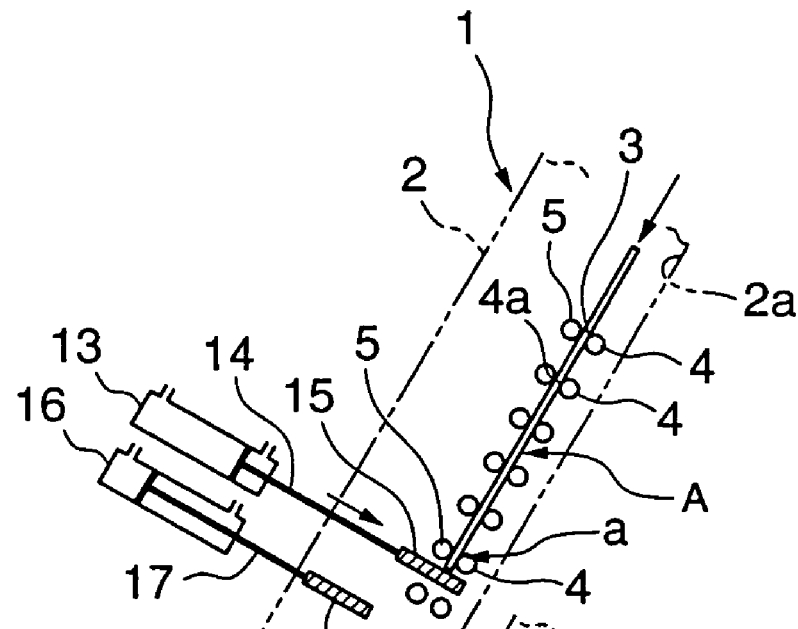
FIGS. 3A to 3C are schematic operation views showing main sections of the other embodiment of the present invention.

That is, at a standby stage in which the object A is put into the treatment section 1, by a downward movement of a cylinder rod 14, the first operation piece 15 is lowered to be equal to or lower than a level of a bearing roller top surface 4a in the cylinder 2 to close a passage space of the object A (FIG. 3A).

Thus, the object A put into the treatment section 1 is first retained by the first operation piece 15, and then held in this position for a desired time to be treated with a gas for a desired time (FIG. 3A).

After the passage of the desired time, when the first operation piece 15 is raised by a rising movement of the cylinder rod 14 to be removed from the passage space of the object A. Thus, the object A is moved by a desired distance toward the outlet 7.

Figure 3B:
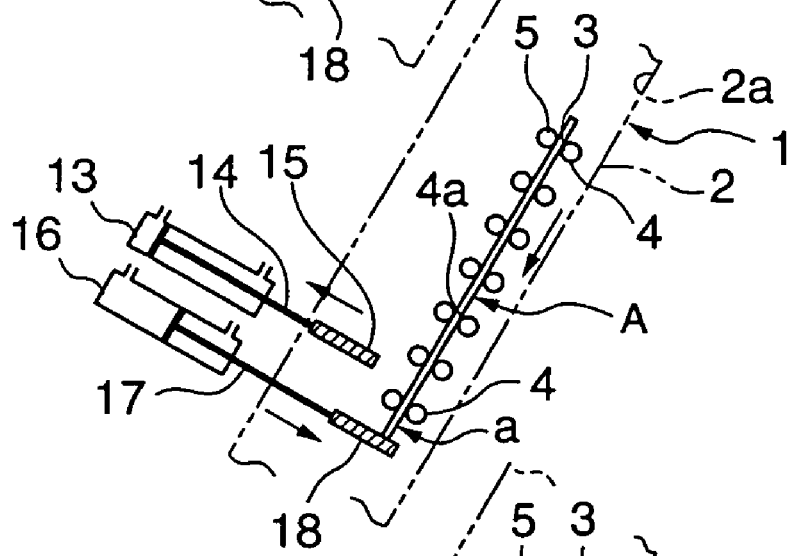

At this time, by a downward movement of a cylinder rod 17, the second operation piece 18 of a downstream side is lowered to be equal to or lower than the level of the bearing roller top surface 4a in the cylinder 2, the passage space of the object A is closed, and the object A is held in this portion for a desired time to be treated with the gas again for a desired time (FIG. 3B).

Figure 3C:
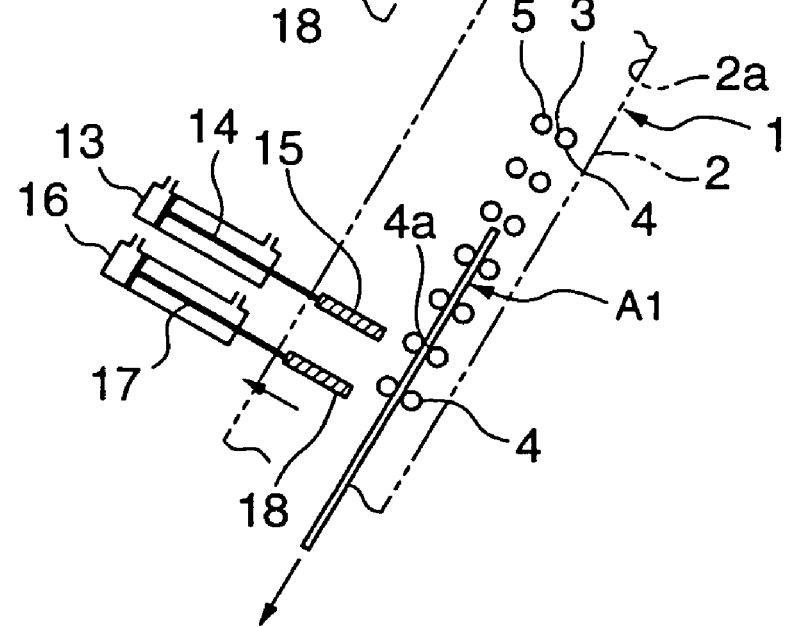

Then, when the cylinder rod 17 of the second operation piece 18 is raised again, the second operation piece 18 is removed from the passage space of the object A, and the treated object A1 is slid into contact to be lowered toward the outlet 7 (FIG. 3C). Operation effects of the embodiment are similar to those of the first embodiment, and thus description thereof will be omitted.

Third Embodiment

The following embodiment is also within the scope of the present invention.

That is, a constitution may be employed in which a single operation piece 19 is disposed in a direction orthogonal to an advancing direction of the object A in the treatment section 1, and the operation piece 19 can be swung by a swinging mechanism (not shown). For example, a specific embodiment will be described by referring to FIG. 4.

The operation piece 19 employs a structure in which the object A retained in the treatment section 1 is held in a fixed place for a desired time to be treated with a gas, then it is swung back or forth in the advancing direction, and held in a position to which the object A has been moved by a desired distance to be treated with the gas again for a desired time. Additionally, the operation piece 19 can employ a structure in which the object A retained in the treatment section 1 is repeatedly swung back and forth in the advancing direction for a desired time, and the object A is swung back and forth to be entirely treated with a gas.

Then, after completion of the treatment work, the operation piece 19 is swung (rotated) upward to be removed from the passage space of the object A, whereby the treated object A1 is slid into contact to be lowered in a discharging direction. Operation effects of the embodiment are similar to those of the first embodiment, and thus description thereof will be omitted.

Fourth Embodiment

An embodiment in which the treatment section 1 is constituted of only a mechanism for holding the object A in a fixed place in the gas atmosphere in the treatment section 1 for a desired time is also within the scope of the present invention. The following is an example. Drawings are omitted in this case.

The description is not limitative but only illustrative, and design changes can be made within the scope of the present invention.

Figure 4:
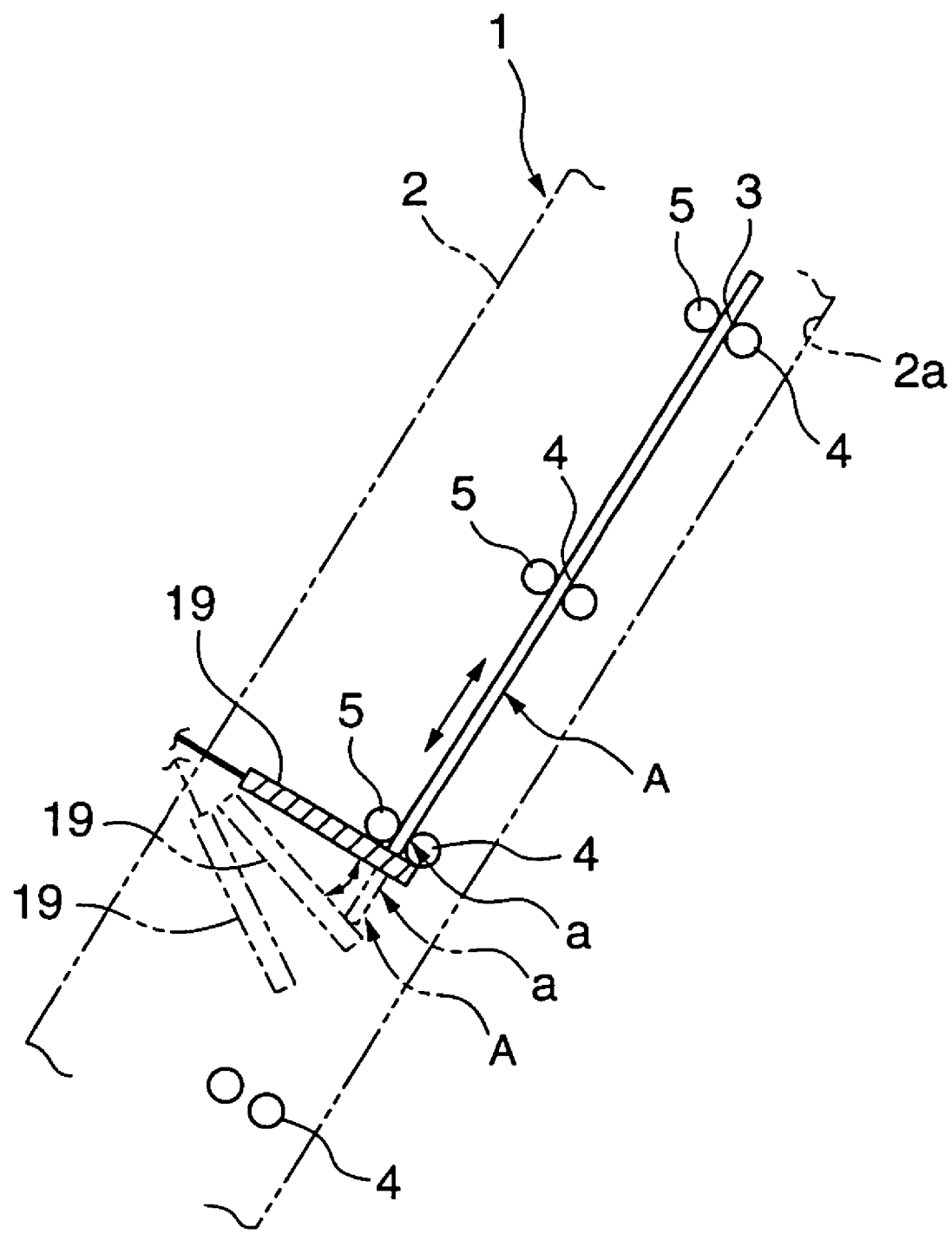
FIG. 4 is a schematic operation view showing a main section of the other embodiment of the present invention.

A single plate member of a shape similar to that of the operation piece 19 shown in FIG. 4 is disposed in a direction (passage space) orthogonal to an advancing direction of the object in the treatment section 1, and the single plate member is a mechanism to be vertically moved by an air cylinder or the like. Thus, the object is held by the plate member in a desired position in a gas atmosphere in the treatment section to be treated with a gas for a fixed time, and then the plate member is raised by a rising movement of the cylinder to be removed from the passage space of the object, whereby the treated object is slid into contact to be lowered in a discharging direction.

A conveying mechanism 20 conveys the treated object A1 from the object outlet 7 position of the treatment section 1 to the outside of the apparatus. According to the embodiment, the treated object A1 discharged from the outlet 7 of the treatment section 1 is conveyed in a state of being held between a pair of upper and lower belt conveyors 21, 22.

The conveying mechanism 20 should not be limited to the structure of the embodiment. For example, it may be constituted of only the lower belt conveyor 22 (shown) of the embodiment, and a well-known conveying mechanism is properly selected within the scope of the present invention. In the drawing, a reference numeral 37 denotes a free pressing roller disposed above the tail end side pulley 23 of the conveying mechanism 20, 36 a second conveying mechanism, and 38 a third conveying mechanism disposed outside the apparatus.

According to the embodiment, the outlet 7 side of the treatment section 1 and one end side of the conveying mechanism 20 opposite the outlet 7 side are positioned in a desired liquid 33 which has filled a water tank 32. Accordingly, the outlet 7 side of the treatment section 1 can be closed to prevent gas leakage from the liquid 33. In the drawing, a reference numeral 8 denotes a guiding member for guiding the treated object A1 discharged from the outlet 7 to the conveying mechanism 20. According to the embodiment, water is used for the liquid 33. However, a neutralized liquid may be used.

In the case of the embodiment in which one end side of the conveying mechanism 20 is positioned in the liquid 33, in order to remove moisture stuck to the treated object A1 out of the liquid 33, for example, a desired moisture removing mechanism such as an air blow 24 is disposed in the vicinity of the conveying mechanism 20. Preferably, the upper and lower belts 21, 22 of the conveying mechanism 20 are totally meshed to contribute to the moisture removal.

The embodiment has been described based on the short object such as a wiper blade formed in a product shape. However, treatment of a continuous long product formed by extrusion molding with a gas is also within the scope of the present invention, and this gas treatment can be carried out by using the aforementioned method and apparatus.

In this case, since the upper pressing roller 22 can be separated from the tail end side pulley 27 of the object feeding mechanism 26, in the case of the continuous long object, the feeding mechanism 26 and the pressing roller 28 are separated from each other, and only the feeding mechanism 26 is used.

According to the present invention, in the case of treating the long object with the gas, the constitution is very useful especially when the long object is set at the time of starting each work (initial stage).

That is, Jpn. Pat. Appln. KOKOKU Publication No. 4-19021 is known as a conventional art. According to this art, when the long object is set on the apparatus at the time of starting work, an operator must directly enter the box which covers the entire apparatus, directly insert a hand into the water tank to pull out a tip of the long object from the lower end of the treatment section, hook the pulled out long object on the roller positioned in the water tank to pull it out upward, and take it out of the box.

This operation has not only a problem of workability simply because of burdensome work, but also it is very dangerous because the worker must directly enter the box to work in which there may be leakage of a harmful gas such as a chlorine gas.

According to the present invention, if the long object is forcibly fed through the object inlet 6 of the treatment section 1 by the feeding mechanism 26, a tip of the object passed in the treatment section 1 reaches the conveying mechanism 20 through the guiding member 8, and the tip of the object which has reached the conveying mechanism 20 is forcibly pulled out of the box 31 by the conveying mechanism 20. Thus, not only workability can be improved but also very high safety can be provided without any direct entry of the body of the worker in the box in which there may be leakage of a harmful gas different from the conventional case.

According to the present invention, there can be provided a method and a reaction apparatus which can safely and continuously treat/discharge an object to be treated without direct contact with a gas atmosphere, and which surely/efficiently treat the object with a gas without any uneven treatment.

What is claimed is:

1. A reaction apparatus for treating an object with a gas, comprising:
    a treatment section which includes at least a treatment gas injection section, an inlet for the object and an outlet for the treated object, and a structure in which the object is automatically conveyed from the inlet to the outlet and is treated with the gas in a hermetically sealed space, said treatment section further including a mechanism for holding the object in a gas atmosphere in the treatment section in a fixed place for a desired time and a mechanism for moving or swinging the object to prevent unevenness of the treatment;
    a conveying mechanism for conveying the treated object from the outlet of the treatment section to the outside of the apparatus;
    at least two operation pieces disposed back and forth in a direction orthogonal to an advancing direction of the object in the treatment section to freely move up and down,
    wherein the two operation pieces are constituted of a first operation piece positioned on the inlet side of the object to be treated, and a second operation piece positioned on the outlet side of the treated object;
    the first operation piece holds the object in a fixed place for a desired time to treat the object with the gas for a desired time, and then the first operation piece is raised to lower the object toward the outlet by a desired distance; and
    the second operation piece receives the object passed through the raised first operation piece, holds the object in a fixed place for a desired time to treat the object with the gas again for a desired time, and then the second operation piece is raised to lower the object toward the outlet.

2. The reaction apparatus according to claim 1,
    wherein the first and second operation pieces are formed to be different lengths: the first operation piece being formed to be short, and the second operation piece being formed to be long, and the operation pieces are vertically moved by the same mechanism.

3. The reaction apparatus according to claim 1,
    wherein the first and second operation pieces are vertically moved by different mechanisms.

4. A reaction apparatus for treating an object with a gas, comprising:
    a treatment section which includes at least a treatment gas injection section, an inlet for the object and an outlet for the treated object, and a structure in which the object is automatically conveyed from the inlet to the outlet and is treated with the gas in a hermetically sealed space, said treatment section further including a mechanism for holding the object in a gas atmosphere in the treatment section in a fixed place for a desired time and a mechanism for moving or swinging the object to prevent unevenness of the treatment;
    a conveying mechanism for conveying the treated object from the outlet of the treatment section to the outside of the apparatus;
    an operation piece disposed in the treatment section in a direction orthogonal to the advancing direction of the object,
    wherein the operation piece is adapted to be swung by a swinging mechanism.

5. The reaction apparatus according to claim 4,
    wherein the operation piece has a structure in which the object received in the treatment section is held in a fixed place for a desired time to be treated with the gas, swung back or forth in the advancing direction, and then held in a position to which it has been moved by a desired distance to be treated again with the gas for a desired time.

6. The reaction apparatus according to claim 4,
    wherein the operation piece has a structure in which the object received in the treatment section is swung back and forth in the advancing direction for a desired time to be treated with the gas.

7. A reaction apparatus for treating an object, such as a wiper blade for cleaning window glasses of automobiles, electric trains and the like, with a gas comprising:
    a treatment section which includes at least a treatment gas injection section, an inlet for the object, and an outlet for the treated object, and a structure in which the object is automatically conveyed from the inlet to the outlet and is treated with the gas in a hermetically sealed space;
    a conveying mechanism for conveying the treated object from the outlet of the treatment section to the outside of the apparatus;

a guiding member for guiding the object which is shorter than a length of the treatment section from an upper reach side to a lower reach side being arranged in the treatment section in the longitudinal direction of the treatment section; and a mechanism for holding and treating the object with gas at a fixed place in the gas atmosphere in the treatment section for a desired time, and a mechanism for moving or swinging the object in the treatment section and treating the object with gas so as to prevent unevenness of the treatment.

8. The reaction apparatus according to claim 7, further comprising:

at least two operation pieces disposed back and forth in a direction orthogonal to an advancing direction of the object in the treatment section to freely move up and down, wherein the two operation pieces are constituted of a first operation piece positioned on the inlet side of the object to be treated, and a second operation piece positioned on the outlet side of the treated object;

the first operation piece holds the object in a fixed place for a desired time to treat the object with the gas for a desired time, and then the first operation piece is raised to lower the object toward the outlet by a desired distance; and the second operation piece receives the object passed through the raised first operation piece, holds the object in a fixed place for a desired time to treat the object with the gas again for a desired time, and then the second operation piece is raised to lower the object toward the outlet.

9. The reaction apparatus according to claim 8, wherein the first and second operation pieces are formed to be different lengths, said first operation piece being formed to be short, and said second operation piece being formed to be long, said operation pieces being vertically moved by the same mechanism.

10. The reaction apparatus according to claim 8, wherein the first and second operation pieces are vertically moved by different mechanisms.

11. The reaction apparatus according to claim 7, further comprising:

an operation piece disposed in the treatment section in a direction orthogonal to the advancing direction of the object, said operation piece being adapted to be swung by a swinging mechanism.

12. The reaction apparatus according to claim 11, wherein the operation piece has a structure in which the object received in the treatment section is held in a fixed place for a desired time to be treated with the gas, swung back and forth in the advancing direction, and then held in a position to which it has been moved by a desired distance to be treated again with the gas for a desired time.

13. The reaction apparatus according to claim 11, wherein the operation piece has a structure in which the object received in the treatment section is swung back and forth in the advancing direction for a desired time to be treated with the gas.

14. The reaction apparatus according to claim 7, wherein the outlet side of the treatment section and one end side of the conveying mechanism facing the outlet side are positioned in a water tank filled with a desired liquid.

15. The reaction apparatus according to claim 7, wherein the object is a wiper blade.

16. The reaction apparatus according to claim 15, wherein the wiper blade is made of rubber or a synthetic resin.

17. The reaction apparatus according to claim 7, further comprising:

a feeding mechanism and a pressing roller disposed in the vicinity of the object inlet to forcibly feed the object through the object inlet by holding it therebetween, said pressing roller being adapted to be separated.

\* \* \* \* \*